(12) United States Patent
Vignali et al.

(10) Patent No.: US 9,381,787 B2
(45) Date of Patent: Jul. 5, 2016

(54) GENERALLY WYE SHAPED ELBOW FOR CABIN AIR FLOW SYSTEM

(71) Applicant: Hamilton Sundstrand Corporation, Windsor Locks, CT (US)

(72) Inventors: Mark Vignali, Northfield, CT (US); Caroline Rupp, Manchester, CT (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 860 days.

(21) Appl. No.: 13/661,069

(22) Filed: Oct. 26, 2012

(65) Prior Publication Data

US 2014/0120821 A1   May 1, 2014

(51) Int. Cl.
  *F16L 41/02* (2006.01)
  *B60H 1/00* (2006.01)
  *B64D 13/02* (2006.01)

(52) U.S. Cl.
  CPC .......... *B60H 1/00564* (2013.01); *F16L 41/023* (2013.01); *B64D 13/02* (2013.01)

(58) Field of Classification Search
  CPC .... F24F 13/02; F24F 13/062; B60H 1/00564; F16L 41/023
  USPC .............. 454/76; 137/561 A, 115.01–118.01; 181/224, 225; 29/34 R
  See application file for complete search history.

(56) References Cited

U.S. PATENT DOCUMENTS

| | | | | |
|---|---|---|---|---|
| 1,825,103 A * | 9/1931 | Stacey, Jr. | F15D 1/04 | 137/875 |
| 1,960,557 A * | 5/1934 | Snyder | F16L 43/001 | 138/155 |
| 2,057,038 A * | 10/1936 | Lindquist | B21C 37/283 | 285/134.1 |
| 2,303,949 A * | 12/1942 | Nordell | F16L 43/001 | 138/39 |
| 2,479,578 A * | 8/1949 | Langvand | F16L 41/023 | 228/141.1 |
| 2,533,720 A * | 12/1950 | Danel | F16L 41/023 | 285/132.1 |
| 2,762,635 A * | 9/1956 | Lorber | F16L 41/084 | 122/510 |
| 3,319,650 A * | 5/1967 | Peterson | B65G 53/56 | 137/561 R |
| 3,342,209 A * | 9/1967 | Florin | B21D 51/24 | 137/561 R |
| 3,411,451 A * | 11/1968 | Matthias | F04D 29/4273 | 138/39 |
| 3,586,058 A * | 6/1971 | Ahrens | D04C 1/06 | 138/103 |
| 3,850,459 A * | 11/1974 | Blumenkranz | F16L 47/32 | 285/133.3 |

(Continued)

FOREIGN PATENT DOCUMENTS

CH   702954 A2 * 10/2011 ....... F02M 35/10144
CN   1902089 A   1/2007

(Continued)

OTHER PUBLICATIONS

CH 702954 A2, Kiener et al, Oct. 14, 2011 Espacenet machine translation worldwide.espacenet.com/publicationDetails.*

*Primary Examiner* — Steven B McAllister
*Assistant Examiner* — Frances F Hamilton
(74) *Attorney, Agent, or Firm* — Carlson, Gaskey & Olds, PC

(57) ABSTRACT

An elbow for use in a cabin air supply system for an aircraft has an inlet duct. The inlet duct diverges into two outlet ducts with an interface area between the outlet ducts. Each of the outlet ducts has a nominal wall thickness, with a central portion of the interface having a first thickness at a point of maximum thickness, and the nominal wall thickness being of a second thickness. The central portion of the interface curves to the central portion of the interface area. A ratio of the first thickness to the second thickness is between 3 and 8. A cabin air supply system is also disclosed.

4 Claims, 2 Drawing Sheets

(56) References Cited

U.S. PATENT DOCUMENTS

| | | | |
|---|---|---|---|
| 3,944,261 A * | 3/1976 | Reed | A61M 39/10 156/73.1 |
| 3,979,809 A * | 9/1976 | Schneider | B21C 37/28 228/170 |
| 4,378,122 A * | 3/1983 | Ohno | B60G 21/055 138/109 |
| 4,430,867 A * | 2/1984 | Warner | B60H 1/32 62/172 |
| 4,440,712 A * | 4/1984 | Imgram | B29C 53/083 138/109 |
| 4,445,342 A * | 5/1984 | Warner | B64D 13/06 236/13 |
| 4,457,364 A * | 7/1984 | DiNicolantonio | C10G 9/002 165/134.1 |
| 4,971,307 A * | 11/1990 | Killerud | F16L 41/023 138/172 |
| 4,978,064 A * | 12/1990 | Steiner | B64D 13/08 237/12.3 A |
| 5,312,141 A * | 5/1994 | Hannity | F16L 19/061 285/128.1 |
| 5,339,868 A * | 8/1994 | Naoi | F16L 43/001 138/172 |
| 6,024,639 A * | 2/2000 | Scherer | B64D 13/00 340/522 |
| 6,065,784 A * | 5/2000 | Lundstrom | F16L 47/32 285/368 |
| 6,273,136 B1 | 8/2001 | Steinert et al. | |
| 6,283,410 B1 | 9/2001 | Thompson | |
| 6,422,608 B1 * | 7/2002 | Lee | B65G 53/523 285/131.1 |
| 6,491,254 B1 | 12/2002 | Walkinshaw et al. | |
| 6,681,591 B2 | 1/2004 | Defrancesco et al. | |
| 6,681,592 B1 | 1/2004 | Lents et al. | |
| 6,920,959 B2 * | 7/2005 | Han | F04D 29/542 181/222 |
| 6,928,832 B2 | 8/2005 | Lents et al. | |
| 7,000,634 B2 * | 2/2006 | Lindborg | F16K 1/123 137/625.3 |
| 7,497,772 B2 * | 3/2009 | Laib | F16L 41/082 138/44 |
| 7,775,447 B2 | 8/2010 | Scherer et al. | |
| 8,052,087 B2 | 11/2011 | Jorn | |
| 8,132,737 B2 | 3/2012 | Eichholz et al. | |
| 8,157,209 B2 | 4/2012 | Dittmar et al. | |
| 8,463,496 B2 * | 6/2013 | Ernst | B64D 13/06 454/74 |
| 8,505,574 B2 * | 8/2013 | Petersen | A01C 7/084 111/175 |
| 8,640,734 B2 * | 2/2014 | Lee | F16L 137/561 A |
| 2002/0046773 A1 * | 4/2002 | Bishop | B63B 25/14 137/259 |
| 2002/0185865 A1 * | 12/2002 | Steffan | B29C 31/06 285/131.1 |
| 2003/0141413 A1 * | 7/2003 | Brasseur | B60H 1/00371 244/118.5 |
| 2004/0195828 A1 * | 10/2004 | Holmes | F16L 41/021 285/131.1 |
| 2005/0035592 A1 * | 2/2005 | Williams | F16L 41/021 285/125.1 |
| 2005/0134038 A1 * | 6/2005 | Walsh | F16L 41/021 285/125.1 |
| 2006/0089604 A1 * | 4/2006 | Guerrero | A61M 5/1408 604/247 |
| 2006/0172676 A1 * | 8/2006 | Ebner | B60H 1/0055 454/152 |
| 2008/0032618 A1 * | 2/2008 | Katoh | B60H 1/00564 454/143 |
| 2009/0261579 A1 * | 10/2009 | Spears | F16L 43/008 285/133.5 |
| 2010/0126182 A1 * | 5/2010 | Hoover | F01D 17/105 60/785 |
| 2012/0223466 A1 * | 9/2012 | Ebner | F23C 3/002 266/249 |
| 2013/0100759 A1 * | 4/2013 | Wittbold | F17D 1/08 366/3 |
| 2014/0045415 A1 * | 2/2014 | Mansfield-Marcoux | F16L 41/023 454/76 |

FOREIGN PATENT DOCUMENTS

| | | | | |
|---|---|---|---|---|
| CN | 102123909 A | | 7/2011 | |
| DE | 1112356 B | * | 8/1961 | F16L 41/023 |
| DE | 1779836 A1 | * | 5/1971 | A41H 3/00 |
| WO | WO 2009127192 A1 | * | 10/2009 | F15D 1/04 |

* cited by examiner

GENERALLY WYE SHAPED ELBOW FOR CABIN AIR FLOW SYSTEM

BACKGROUND OF THE INVENTION

This application relates to a fluid elbow for communicating a source of compressed air to outlets, which are part of an air supply system for an aircraft cabin.

Aircraft cabins are provided with a source of heated air, typically from an air compressor. In one such system the air compressor delivers air into an inlet of an elbow, and the elbow has two outlets. Each outlet leads to a trim valve, which in turn controls the flow of the heated air to ducts within the aircraft cabin.

As with all components on an aircraft, it is desirable to reduce the weight of the elbow. Thus, the elbow is provided with relatively thin walls.

SUMMARY

A generally wye shaped elbow for use in a cabin air supply system for an aircraft has an inlet duct. The inlet duct diverges into two outlet ducts with an interface area between the outlet ducts. Each of the outlet ducts has a nominal wall thickness, with a central portion of the interface having a first thickness at a point of maximum thickness, and the nominal wall thickness being of a second thickness. The central portion of the interface curves to the central portion of the interface area. A ratio of the first thickness to the second thickness is between 3 and 8. A cabin air supply system is also disclosed.

These and other features of this application will be best understood from the following specification and drawings, the following of which is a brief description.

DETAILED DESCRIPTION

Figure 1:
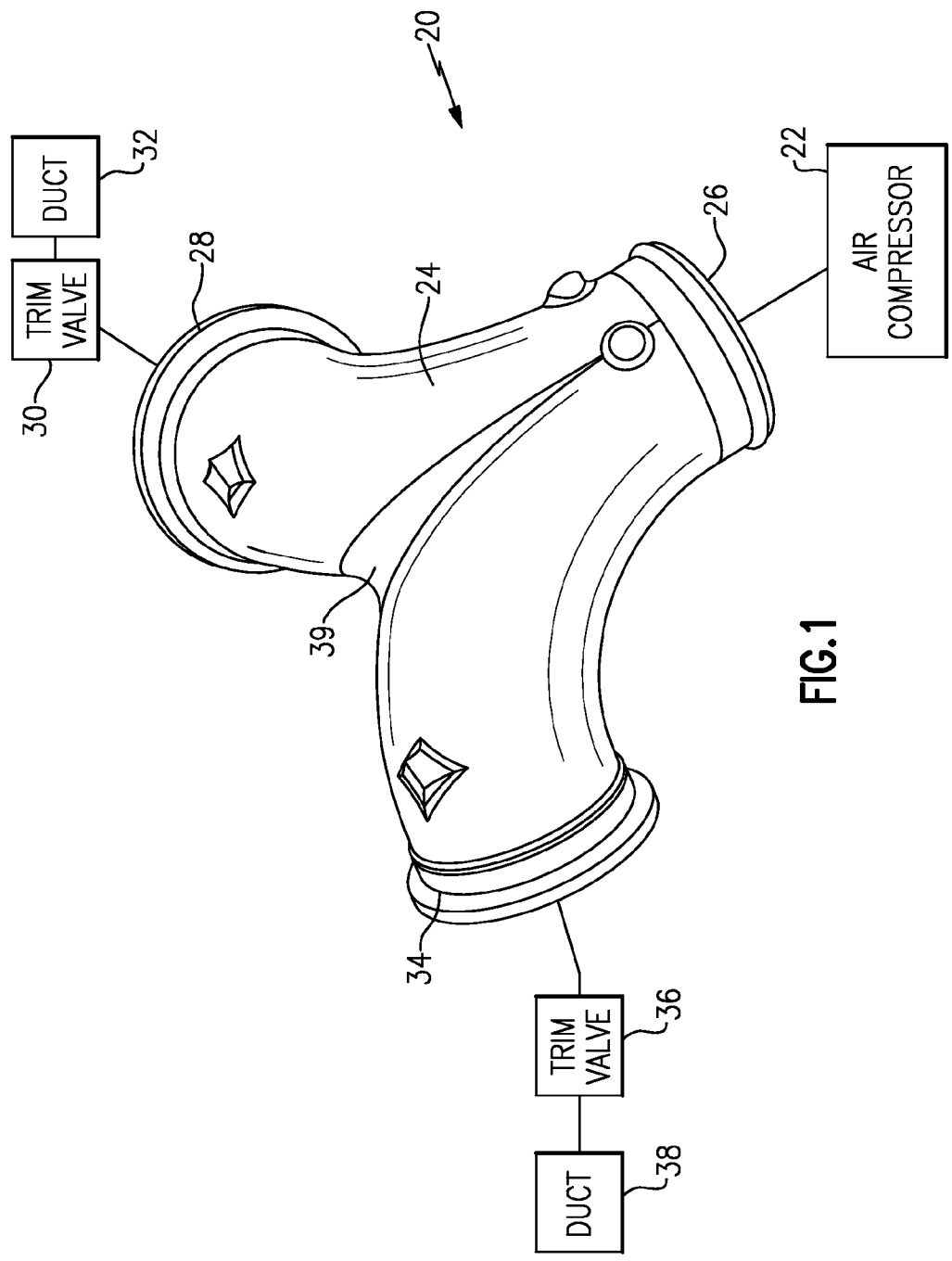
FIG. 1 schematically shows a cabin air supply system for an aircraft.

A cabin air supply system 20 is illustrated in FIG. 1. An air compressor 22 compresses air and delivers into an elbow 24 at an inlet duct 26. The elbow 24 is formed of aluminum. The inlet duct 26 communicates with a first outlet duct 28 which delivers air to trim valve 30, which controls the supply of air to a duct 32. Duct 32 provides heated air into a portion of an aircraft cabin. A second outlet duct 34 delivers heated air to a trim valve 36 and a duct 38. An interface area 39 between outlets 28 and 34 is particularly challenging to design. Applicant has discovered there are stresses and challenges on the interface area that do not suggest the thin walls used elsewhere on the elbows be used.

Figure 2:
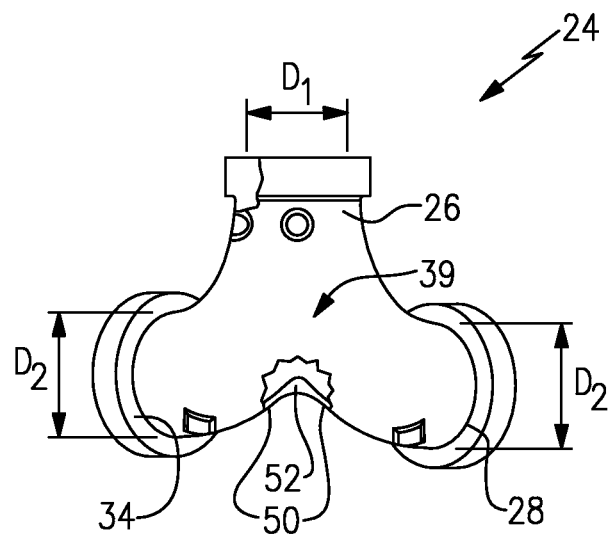
FIG. 2 shows an elbow associated with the FIG. 1 system.

As shown in FIG. 2, interface area 39 is provided with a thicker central portion 52. Central portion 52 is thicker than the nominal wall thickness 50 of the duct leading to the outlets 34 and 28. In one embodiment, the inlet duct 36 had a diameter $D_1$, the outlet duct 34 had a diameter $D_2$, and the outlet duct 28 had the same diameter $D_2$.

In this embodiment $D_1$ was 2.78 inch (7.06 centimeter) and $D_2$ was 2.78 inch (7.06 centimeter).

Figure 3:
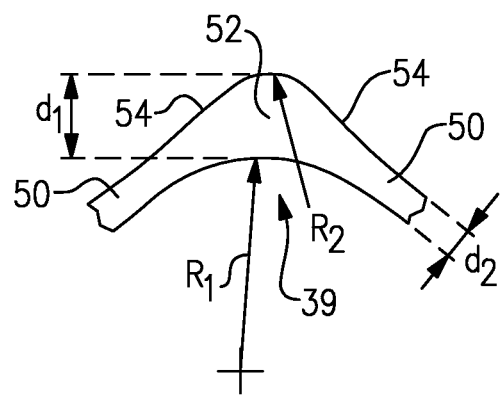
FIG. 3 shows a detail of the FIG. 2 elbow.

As shown in FIG. 3, the central portion 52 has a wall thickness $d_1$, while a nominal wall thickness at 50 is $d_2$. Notably, the central portion wall thickness is not a constant and varies continuously from the nominal wall thickness near the inlet to the maximum in the region shown). In one embodiment, $d_1$ was 0.5 inch (1.27 centimeter), and $d_2$ was 0.11 inch (0.28 centimeter). As also shown, the sides 54 of the thicker interface 39 curve upwardly to the thickest central portion 52.

Also, an outer face of the interface area 39 is formed on a radius $R_1$. In this same embodiment $R_1$ was 0.75 inch (1.905 centimeter). A radius $R_2$ on the opposite side was 0.26 inch (0.66 cm)

In embodiments, a ratio of the maximum $d_1$ to $d_2$ was between 3 and 8. A ratio of $d_1$ to $R_1$ was between 0.5 and 0.9. A ratio of $D_2$ to $d_1$ was between 4 and 7. A ratio of $R_1$ to $R_2$ was between 2.4 and 3.4.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An elbow for use in a cabin air supply system for an aircraft comprising:
    an inlet duct diverging into two outlet ducts with an interface area between said outlet ducts; said inlet duct having a first diameter, and said two outlet ducts each having a second diameter;
    a nominal wall thickness between said interface area and said outlet ducts, with a central portion of said interface area having a first thickness at a point of maximum thickness, and said nominal wall thickness being of a second thickness, and wherein said interface area curving to said central portion of said interface area, and a ratio of said first thickness to said second thickness being between 3 and 8;
    wherein said outlet duct having a second diameter, and a ratio of said second diameter to said first thickness being between 4 and 7;
    wherein an outer face of said central portion of said interface area is formed at a first radius of curvature, and a ratio of said first thickness to said first radius of curvature is between 0.5 and 0.9 ; and
    wherein a ratio of said first radius of curvature to radius of curvature on an inner face of said inner face area face is between 2.4 and 3.4.

2. A cabin air supply system comprising:
    a cabin air compressor delivering air into an inlet duct of an elbow, and said elbow having two outlet ducts, with each of said outlet ducts communicating to trim valves, with said trim valves selectively supplying air to ducts to be positioned in an aircraft cabin;
    said inlet duct diverging into said two outlet ducts with an interface area section between said outlet ducts; said inlet duct having a first diameter, and said two outlet ducts each having a second diameter;
    a nominal wall thickness between said interface area and said outlet ducts, with a central portion of said interface area having a first thickness at a point of maximum thickness, and said nominal wall thickness being of a second thickness, and wherein said interface area curving to said central portion of said interface area, and a ratio of said first thickness to said second thickness being between 3 and 8;
    wherein said outlet ducts having a second diameter, and a ratio of said second diameter to said first thickness being between 4 and 7;
    wherein an outer face of said central portion of said interface area is formed at a first radius of curvature and a ratio of said first thickness to said first radius of curvature is between 0.5 and 0.9; and wherein a ratio of said first radius of curvature to a radius of curvature on an inner face of said inner area is between 2.4 and 3.4.

3. The cabin air supply system as set forth in claim 2, wherein said elbow is formed of aluminum.

4. An elbow for use in a cabin air supply system for an aircraft comprising:

an inlet duct diverging into two outlet ducts with an interface area between said outlet ducts; said inlet duct having a first diameter, and said two outlet ducts each having a second diameter;

a nominal wall thickness between said interface area and said outlet ducts, with a central portion of said interface area having a first thickness at a point of maximum thickness, and said nominal wall thickness being of a second thickness, and wherein said interface area curving to said central portion of said interface area, and a ratio of said first thickness to said second thickness being between 3 and 8;

said outlet ducts having a second diameter, and a ratio of said second diameter to said first thickness being between 4 and 7;

an outer face of said central portion of said interface area is formed at a first radius of curvature, and a ratio of said first thickness to said first radius of curvature is between 0.5 and 0.9; and said elbow formed of aluminum.

\* \* \* \* \*